B. & N. PLATT.
Corn Planter.

No. 49,150.

Patented Aug. 1, 1865.

Witnesses:

Inventors.

UNITED STATES PATENT OFFICE.

BURR PLATT, OF PANA, ILL., AND NORMAN PLATT, OF ST. LOUIS, MO.

IMPROVEMENT IN COTTON-SEED PLANTERS.

Specification forming part of Letters Patent No. 49,150, dated August 1, 1865.

*To all whom it may concern:*

Be it known that we, BURR PLATT, of the town of Pana and State of Illinois, and NORMAN PLATT, of the city and county of St. Louis, and State of Missouri, have invented a new Cotton-Seed Planter; and we do hereby declare that the following is a full, clear, and exact description thereof, reference being had to the accompanying drawings, and to the letters of reference marked thereon.

Figure 2:
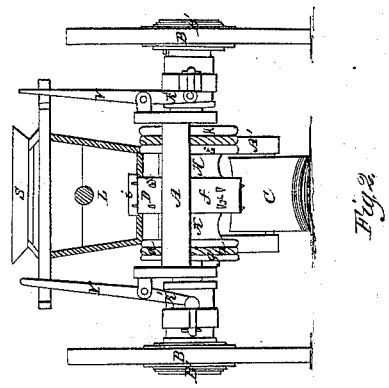
Figure 1:
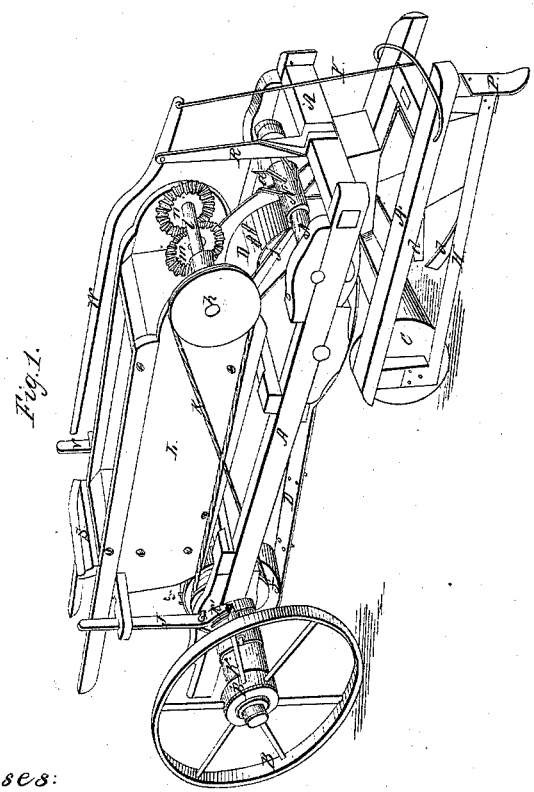
Figure 3:
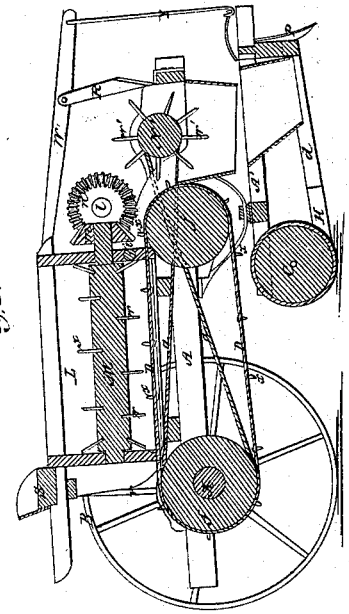

Figure 1 of the annexed drawings is a perspective view of the improved cotton-seed planter. Fig. 2 is a rear end elevation of the same. Fig. 3 is a longitudinal vertical section.

To enable those skilled in the art to make and use our planter, we will proceed to describe its construction and operation.

We construct a frame, A, which is mounted at its rear end on the wheels B, and at its forward end it is supported on the roller C, which is attached to the auxiliary frame A′. The peripheries of the wheels B should be studded with pyramidal projections to prevent their slipping.

The plow P, attached to the forward part of the frame A′, opens the ground to receive the seed, the covering-blades $d$ cover the ground over them, and the roller C follows and presses the ground smoothly over the planted row.

The scrapers H are two pieces of steel or iron plate attached to the frame A′, and are designed to push off out of the way of the row all clods and old rubbish.

The axle K, which connects the two wheels B together, and on which the frame A rests, is provided with the wheels $e\ f\ g$, which are used for the purpose hereinafter mentioned.

The frame A is surmounted with the box L for carrying the seed to be planted. Through the longitudinal axis of this box we place a shaft, M, which is armed with sharp-pointed iron pins $w$, projecting from its periphery radial from its longitudinal axis. A continuation of the shaft M, after passing through the front end of the box L, is provided with a bevel cog-wheel, $m$, through which motion is transmitted to the shaft M, the wheel $m$ receiving its motion from the cog-wheel $n$ on the counter-shaft $l$, which is located across the forward end of the box L, to which its bearings are attached. The belt $k$ passes over the driving-pulley $e$ on the axle K, and from it transmits motion to the small pinion $h$ on the counter-shaft $l$.

The driving-pulley $f$ is located in the longitudinal center of the axle K, and the belt D is drawn around it and the counter-pulley $j$, which is a little in advance of the forward part of the box L. The upper stretch of the belt D, in passing between the pulleys $f$ and $j$, passes through the lower portion of the box L, close to the bottom of it, as is clearly shown in Fig. 3. The outside of the belt D is studded at intervals of one or two inches with short sharp-pointed iron pins $x$, which should be riveted to the strap. The use of this belt will be described hereinafter.

The counter-shaft N, near the forward end of the frame A, is driven by means of the belt $a$ from the driving-pulley $g$. The wheel N′ on the shaft N is studded with iron pins $w'$ similar to those used on the shaft M.

There are clutches K′ on the axle K, which, if moved toward the wheels B by means of the levers V, will connect the axle with the hubs B′, so that the whole axle, with all its driving-wheels, will be set in motion thereby. When the axle is revolving it will turn in its bearings on the frame A; but when the clutches are withdrawn from the hubs the axle will remain relatively stationary and the hubs turn on the arms of the axle.

The covering-blades $d$, previously mentioned, are simply two curved metal plates attached to the frame A′ by being riveted to the scrapers H or any other suitable means.

The lever W, resting on the fulcrum R, which is erected on the forward part of the frame A, is connected by means of the link or rod $y$ with the forward part of the frame A′. The motive power is attached to the forward part of the frame A′.

When this machine is to be set in operation the driver, seated upon the seat S, releases the lever W, so as to let the plow P down into the ground, and at the same time he must slip the clutches K′ up to the hubs B′ by means of the levers V. The box L being filled with seed, the whole machine is ready for a start. All the various parts of the machinery will be set in motion from the driving-wheels $e\ f\ g$ as soon as the machine is drawn forward. The great obstacle to be overcome in planting cotton-seed is to prevent its clogging by keeping it stirred up completely, so that the whole of it may be fed out of the box L without the aid of manual labor. This is accomplished by means of the armed shaft M revolving, so that the pins W stir up the whole mass of the seed continually. The next thing that is to be done is to convey the seeds out of the box and deposit them in the opened furrow. The belt D, with the pins $x$ protruding from it, is given motion in such a direction that the portion of it which passes through the box will be running forward toward the front of the machine. As the belt moves forward the pin $x$ will take up some of the seeds and carry them forward out of the box. Lest the seed should become clogged between the belt and the forward part of the box, we place the roller $i$ in the orifice in the forward part of the box, immediately over the bolt, with only the distance between them requisite for the passage of the seed, and thereby effectually prevent any such clogging. The wheel N′, with its pins $w'$, will pick the seeds off of the belt as it turns over the pulley $j$ and deposit them in the furrow which has been made by the plow P. The operation of covering them has already been described.

When it becomes necessary to turn the machine around the plow should be lifted out of the ground.

Having described our invention, what we claim, and desire to secure by Letters Patent, is—

1. The shaft M, armed with the pins $w$, or their equivalent, revolving in the box L during the process of planting, in combination with the belt D, armed with the pins $x$, or their equivalent, and the roller $i$, all acting for the purpose of stirring up the mass of seed contained in the box L and preventing the same from remaining or becoming a compact mass.

2. Conveying the seed out of the box or reservoir upon a belt studded with metalic pins or their equivalent.

3. The armed wheel N′, revolving immediately in front of the belt as it turns over the pulley to pull the seed off of it.

4. The roller $i$, attached to the box in the upper part of the orifice through which the belt passes through its front end, to prevent the seed clogging at that point.

BURR PLATT.
NORMAN PLATT.

Witnesses as to signature of Norman Platt:
G. P. LAWRENCE,
JOSEPH EDON.

Witnesses as to signature of Burr Platt:
M. RANDOLPH,
A. WAGNER.